(12) United States Patent
Chen

(10) Patent No.: US 7,353,738 B2
(45) Date of Patent: Apr. 8, 2008

(54) CUTTING DEVICE AND METHOD FOR PLASTIC LENS

(75) Inventor: Ying-Chang Chen, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 382 days.

(21) Appl. No.: 10/803,025

(22) Filed: Mar. 18, 2004

(65) Prior Publication Data

US 2005/0204881 A1    Sep. 22, 2005

(30) Foreign Application Priority Data

Jan. 14, 2004 (TW) .............................. 93100886 A

(51) Int. Cl.
*B26D 1/06* (2006.01)

(52) U.S. Cl. .............................. 83/556; 83/563; 83/694

(58) Field of Classification Search .................. 83/622, 83/379, 562, 216, 637, 212.1, 391, 679, 697, 83/694, 529, 566–570, 559, 914; 30/28, 30/175; 72/338; 93/563, 557, 556
See application file for complete search history.

(56) References Cited

U.S. PATENT DOCUMENTS

| | | | | | |
|---|---|---|---|---|---|
| 2,526,955 | A | * | 10/1950 | Kugler | 30/94 |
| 4,449,434 | A | * | 5/1984 | Johnson | 83/98 |
| 4,660,401 | A | * | 4/1987 | Kohama et al. | 72/331 |
| RE33,798 | E | * | 1/1992 | Waltonen | 83/529 |
| 5,784,938 | A | * | 7/1998 | Watkins et al. | 83/528 |
| 5,894,754 | A | * | 4/1999 | Sartorio | 72/422 |

* cited by examiner

*Primary Examiner*—Kenneth E. Peterson

(57) ABSTRACT

A device for cutting a sub-finished assembly (1) of plastic lens (10) includes a cutting member (2) and a holding member (3). The cutting member has a base (20), an upper plate (21), an upper cutter (23) mounted on the upper plate, a lower plate (22), a lower cutter (24) mounted on the lower plate, guiding posts (25) mounted on the base and guiding the movement of the upper and the lower plates, and a stopper (26). The upper plate moves toward the lens before the lower plate and until the upper cutter contacts the cutting point beside the lens. The stopper stops the upper plate from further moving after the upper cutter contacts the cutting point beside the lens. The lower cutter is moved by the lower plate to cut the lens from the sub-finished assembly of the lens. The holding member holds the lens during cutting.

9 Claims, 5 Drawing Sheets

US 7,353,738 B2

CUTTING DEVICE AND METHOD FOR PLASTIC LENS

BACKGROUND OF THE INVENTION

1. Field of the Invention

The present invention relates to a cutting device and method for plastic lens.

2. Description of the Related Art

Currently, lens is usually made of glass or plastic. Since glass lens needs to be ground during manufacturing with a relatively high cost and the cost for making plastic lens is often lower than that for glass lens, plastic lens is popular in consumer electronics commonly seen on the present market, e.g., digital cameras, and eyeglasses. A flow chart of a conventional method for making a plastic lens is shown in FIG. 1. As is shown in FIG. 1, the first step of making plastic lens is to injection mold plastic material in a mold. FIG. 2 is a schematic view of a sub-finished assembly 1 of plastic lens which includes four integrally formed plastic lenses 10. The lenses 10 are connected with each other by input carriers 12 and transmission carriers 13. The sub-finished assembly 1 is cut in a cutting area to separate the lenses 10 from the input and the transmission carriers 12, 13.

After cutting, the lens 10 needs to be plated to improve its optical characteristics. Finally, the lens 10 is packed to be sold.

Plastic lens is conventionally cut manually, which results in many problems. First, manual operation consumes a large amount of time and significantly increases the cost of the product. Second, the lens is apt to be contaminated during manual cutting by dust in the air, dirt on worker's hand, and/or saliva of worker. The contamination affects plating quality or increases cleaning cost before plating. Finally, the cutting precision is dependent on personal factors of workers, such as degree of diligence and level of skill. In addition, with the rapid development of technology, lens needs to be made more and more smaller and manual cutting is more and more difficult and more and more slower.

Thus, an improvement is required to overcome the disadvantages of the prior art.

SUMMARY OF THE INVENTION

A major object of the present invention is to provide a cutting device and method for plastic lens, which effectively reduce product cost, improve product quality, ensure a stable precision and improve manufacturing efficiency.

A cutting device in accordance with the present invention comprises a cutting member and a holding member. The cutting member has a base, an upper plate, an upper cutter mounted on the upper plate, a lower plate, a lower cutter mounted on the lower plate, a number of guiding posts mounted on the base and capable of guiding the movement of the upper and the lower plates, and a stopper. The upper plate moves toward the lens before the lower plate and until the upper cutter contacts the cutting point beside the lens. The stopper stops the upper plate from further moving after the upper cutter contacts the cutting point beside the lens. The lower cutter is moved by the lower plate to cut the lens from the sub-finished assembly of the lens. The holding member holds the lens during the cutting.

Other objects, advantages and novel features of the invention will become more apparent from the following detailed description of the present embodiment when taken in conjunction with the accompanying drawings.

DETAILED DESCRIPTION OF THE INVENTION

Figure 1:
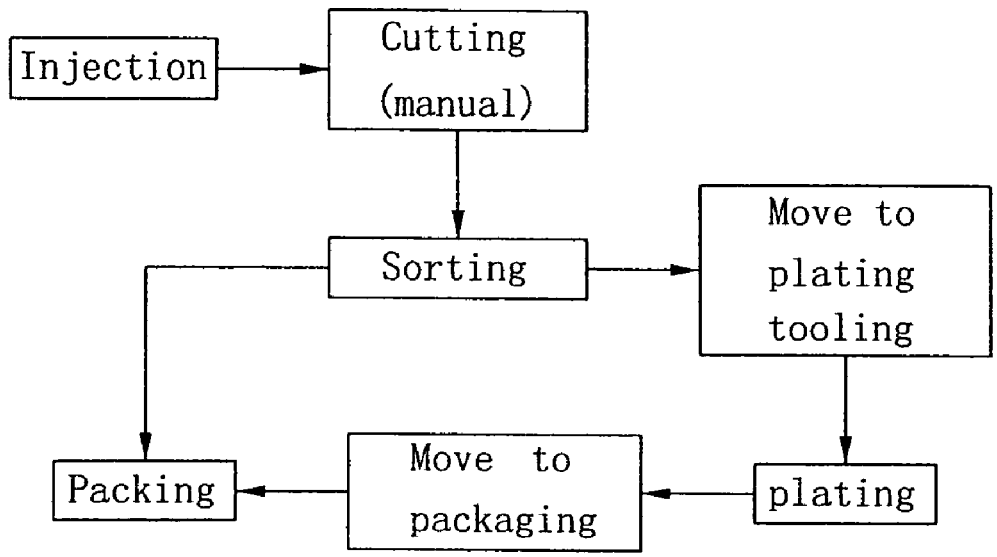
FIG. 1 is a flow chart of a conventional method for making plastic lens.
Figure 2:
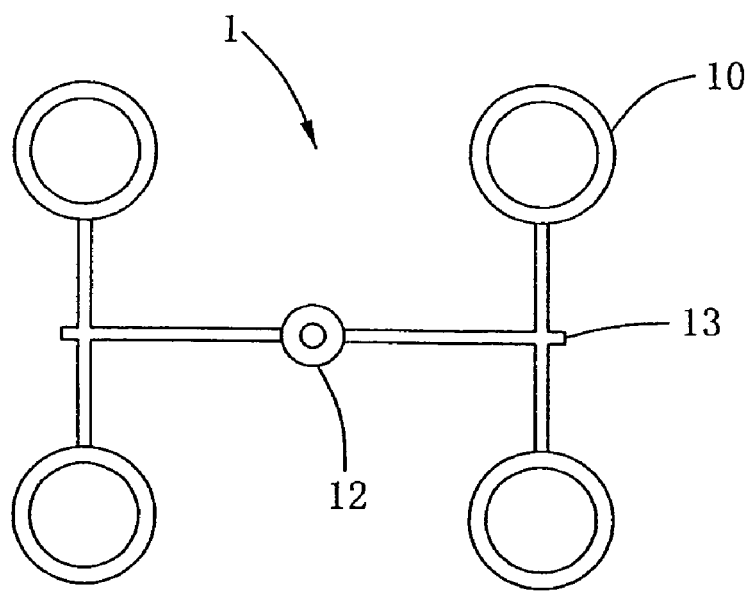
FIG. 2 is a schematic view of a sub-finished assembly of plastic lens after injection molding.
Figure 3:
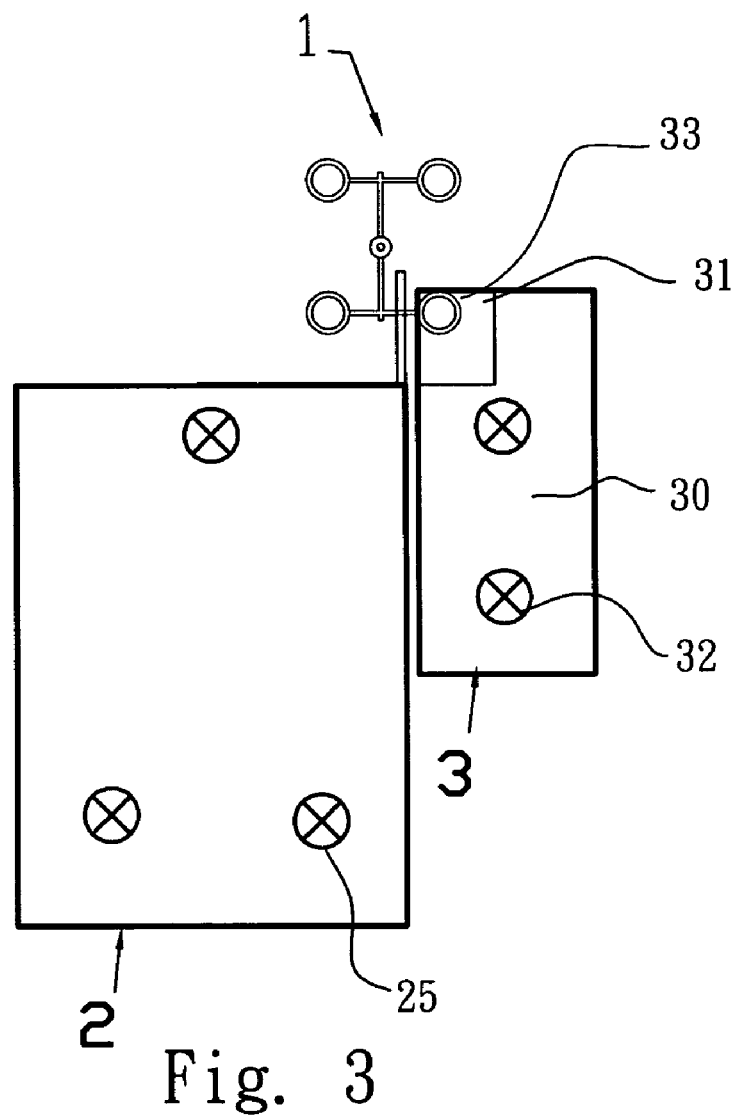
FIG. 3 is a schematic top plan view of a cutting device in accordance with the present invention for plastic lens and a sub-finished assembly of plastic lens to be cut by the cutting device.
Figure 4:
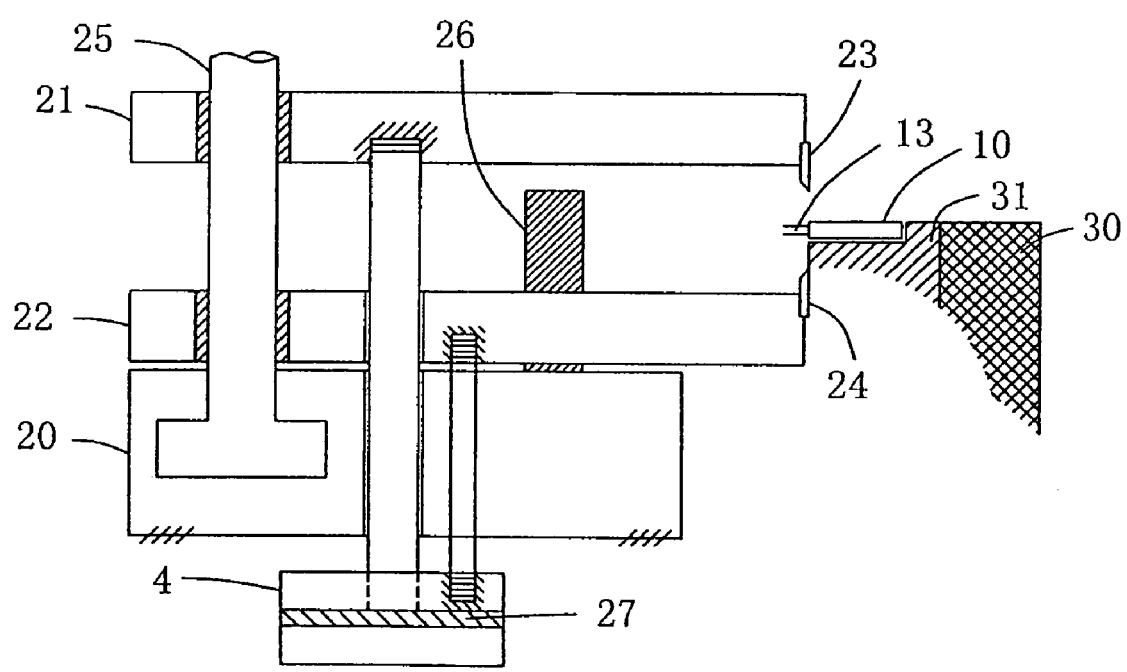
FIG. 4 is a partially cross-sectional view of the cutting device of FIG. 3.

Referring to FIGS. 3 and 4, a cutting device in accordance with the present invention for cutting plastic lens comprises a cutting member 2 and a holding member 3.

The cutting member 2 operates in a way similar to a stamping and cutting mold and comprises a base 20, an upper plate 21, a lower plate 22, an upper cutter 23, a lower cutter 24, guiding posts (including bush) 25 and a stopper 26. The guiding posts 25 position the plates 21, 22 and guide the plates 21, 22 to move away from or toward each other. The upper and the lower cutters 23, 24 are respectively mounted on the upper and the lower plates 21, 22. The cutting member 2 is powered by a cylinder 4. The upper plate 21 is connected to a piston 27 in the cylinder 4 and the lower plate 22 is connected to the cylinder 4.

The holding member 3 comprises a holding plate 30, a holder 31 mounted on the holding plate 30 and a pair of guiding posts 32. The holder 31 defines a recess 33 in a surface thereof for receiving the lens. The holder 31 is exchangeable according to different sizes of the lenses.

Figure 5:
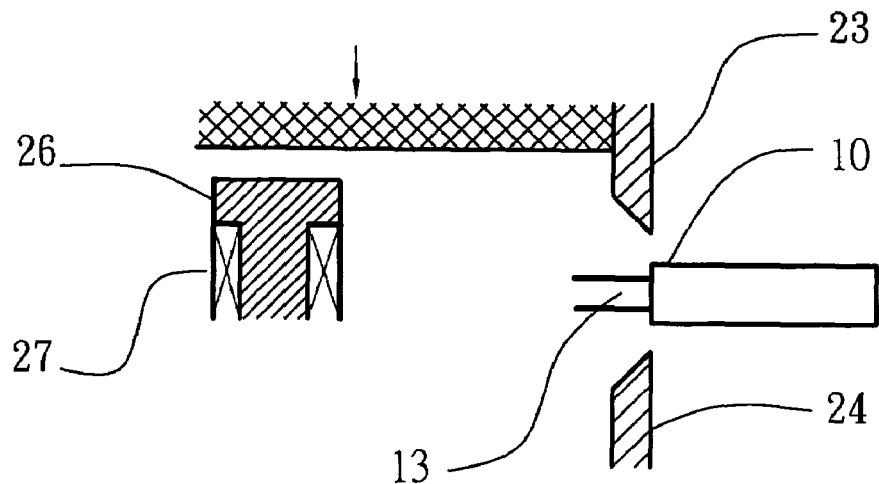
FIGS. 5-7 are schematic views showing an operation process of the cutting device.
Figure 6:
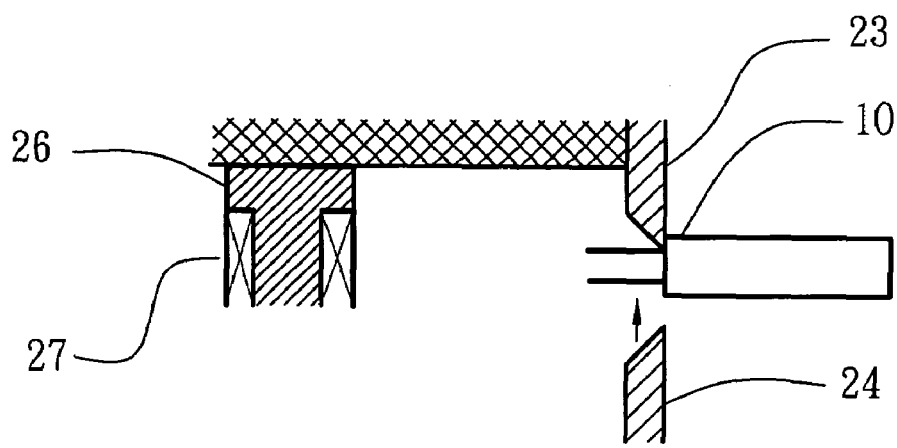
Figure 7:
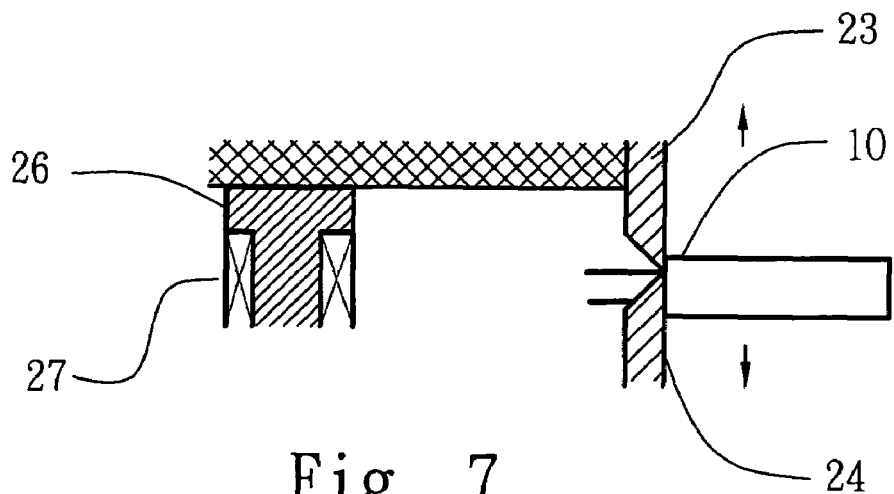

Referring to FIGS. 5 to 7, after the plastic lens 10 together with the input carrier 12 and the transmission carrier 13 is injection molded from plastic material, the sub-finished assembly 1 is transmitted in such a way that the lens 10 is guided into the holder 31 and is fixed in the recess 33 to position the lens 10 in a horizontal direction. The cylinder 4 then actuates the upper plate 21 to move downwardly until the upper cutter 23 contacts the cutting point beside the lens 10 to position the lens 10 in a vertical direction perpendicular to the horizontal direction without causing deformation of the lens 10. The stopper 26 stops the upper plate 21 from further moving after the upper cutter contacts the cutting point. The lower plate 22 moves upwardly after the upper plate 21 until the lower cutter 24 finishes cutting the lens 10 and contacts the upper cutter 23. After cutting, the cylinder 4 actuates the upper and the lower plates 21, 22 to move away from each other to separate the upper and the lower cutters 23, 24. The lens 10 is taken out by tools (not shown), such as clips. Repeating the above process, the cutting can be finished automatically and mechanically.

Since a plurality of lenses 10 are formed in one mold each time, a plurality of cutting devices could be applied to one sub-finished assembly 1 or the assembly 1 could be rotated after finishing cutting of one lens 10 to cut the next lens 10.

Figure 8:
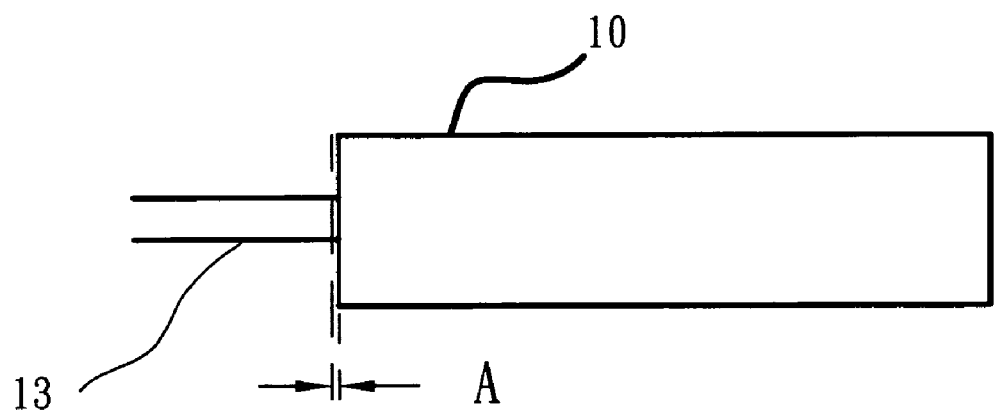
FIG. 8 is a schematic view showing the cutting precision of the present invention.

According to the present invention, heaters (not shown) could be placed in the upper and the lower cutters 23, 24 to adjust the temperature of the cutters 23, 24 and the cutting force could be adjusted for an optimized cutting condition. As is shown in FIG. 8, the precision A of the present invention may be controlled within 0.1 millimeters.

Referring further to FIGS. 5 to 7, to ensure the upper plate 21 moves before the lower plate 22, a resilient component (such as spring) 27 is mounted below the stopper 26. When the upper plate 21 is actuated by the cylinder 4 to move downwardly, the resilient component 27 keeps the lower plate 22 still until the upper plate 21 is stopped by the stopper 26. Then the lower plate 22 overcomes the resilient force of the resilient component 27 and moves upwardly.

Figure 9:
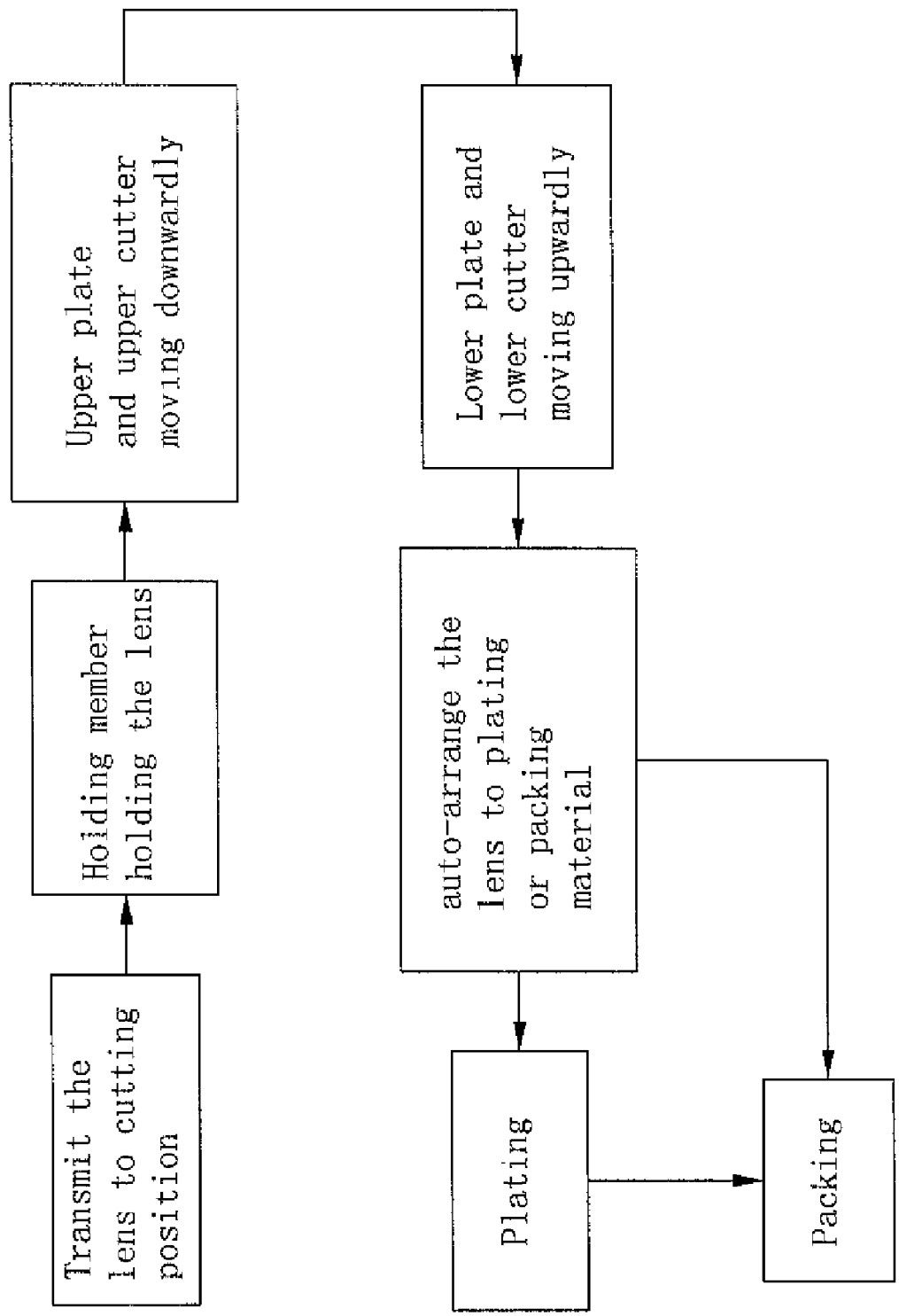
FIG. 9 is a flow chart of a method for making plastic lens including a method in accordance with the present invention for cutting plastic lens.

Please refer to FIG. 9, a method in accordance with the present invention for cutting the plastic lens mainly comprises the following steps: the holding member holding the lens; the upper plate and the upper cutter moving downwardly to contact the contacting point beside the lens; and the lower plate and the lower cutter moving upwardly to cut the lens. Before cutting, the lens needs to be injection molded and transmitted for cutting. After cutting, plating and packing may be still necessary. Before plating, sometimes the lens needs to oriented for automation and economization.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutting device for cutting a plastic lens, comprising:
   a cutting member and a holding member,
   the cutting member comprising a first cutter and a second cutter,
   the first and the second cutters being mounted for relative movement relative to a stationary base in first and second opposed directions away from and toward each other,
   the first cutter first contacting the lens in the first direction,
   a stopper mounted on said base for stopping the first cutter when the first cutter contacts the lens,
   the second cutter being structured to move in the second direction only after the first cutter has stopped moving in the first direction, said second cutter then cooperating with the first cutter to cut the lens completely in the second direction;
   the holding member comprising a holding plate movable in the first and second directions and a holder directly and stationarily mounted on the holding plate, the holder defining a recess that opens in the second direction, the recess receiving the plastic lens therein and supporting the plastic lens in position for cutting.

2. The cutting device as claimed in claim 1, wherein the cutting member comprises a resilient component below the stopper and wherein the resilient component ensures that the second plate moves after the first plate.

3. The cutting device as claimed in claim 2, wherein the resilient component is a spring.

4. The cutting device as claimed in claim 1, wherein the cutting member comprises first and second plates, and the first and second cutters are mounted on and move with the first and second plates, respectively.

5. The cutting device as claimed in claim 4, further comprising a cylinder comprising a piston therein, wherein the first plate is connected with the piston and wherein the second plate is connected to the cylinder.

6. The cutting device as claimed in claim 4, wherein the cutting member comprises guiding posts mounted on the base, the guiding posts guiding the first and the second plates to move therealong.

7. The cutting device as claimed in claim 6, wherein the holding member comprises guiding posts for guiding the holding plate to move therealong.

8. The cutting device as claimed in claim 6, wherein when the first and the second plates respectively move together with the first and the second cutters toward each other, the first plate together with the first cutter moves before the second plate together with the second cutter and until the first cutter contacts a contacting point beside the plastic lens.

9. The cutting device as claimed in claim 1, wherein the holder is exchangeable.

* * * * *